3,174,971
16α,17α-ACETAL AND KETAL DERIVATIVES
OF THE PREGNANE SERIES
Gerald W. Krakower, Elizabeth, N.J., and Josef Fried, Chicago, Ill., assignors to Olin Mathieson Chemical Corporation, New York, N.Y., a corporation of Virginia
No Drawing. Filed Dec. 16, 1963, Ser. No. 330,583
10 Claims. (Cl. 260—239.55)

This invention relates to and has as its object the provision of novel physiologically active steroids, processes for their production and new intermediates useful in the preparation thereof.

More particularly, this invention relates to the provision of compounds of the formulae:

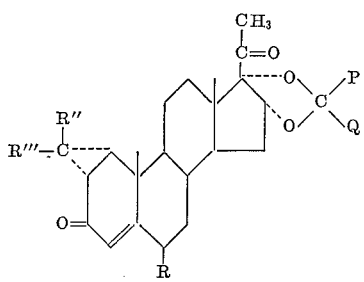

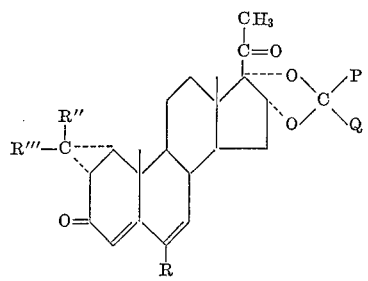

wherein R is selected from the group consisting of hydrogen, lower alkyl (e.g., methyl) and halogen (e.g. chloro); and R" and R''' may be hydrogen, lower alkyl or aryl (phenyl); P is selected from the group consisting of hydrogen, lower alkyl, halo lower alkyl, monocyclic aryl, monocyclic aryl lower alkyl, monocyclic heterocyclic or monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The products of this invention are physiologically active substances which possess progestational activity when administered both in the form of tablets and as a solution or suspension and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets.

The compounds of this invention can be prepared by the process of this invention, entailing a number of steps starting with compounds of the formulae:

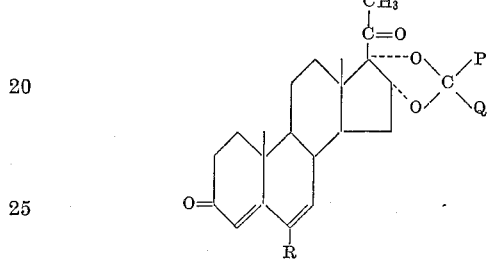

or

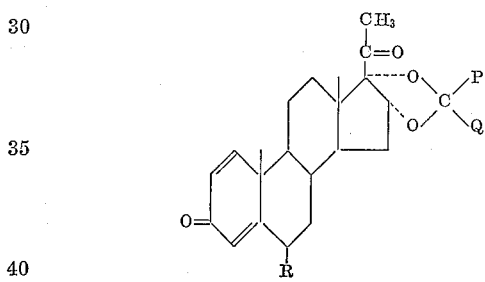

wherein R, P and Q are as hereinbefore defined.

The starting materials of this invention may be prepared according to the teachings and disclosures of copending applications, Serial No. 105,289, filed April 25, 1961, in the names of Patrick A. Diassi and Josef Fried; Serial No. 105,262, filed April 25, 1961, in the names of Josef Fried and Patrick A. Diassi; and Serial No. 99,732, filed March 31, 1961, in the names of Patrick A. Diassi and Josef Fried.

The compounds of this invention may be prepared by the processes of this invention which may be represented by the following equations wherein R, P and Q are as hereinbefore defined:

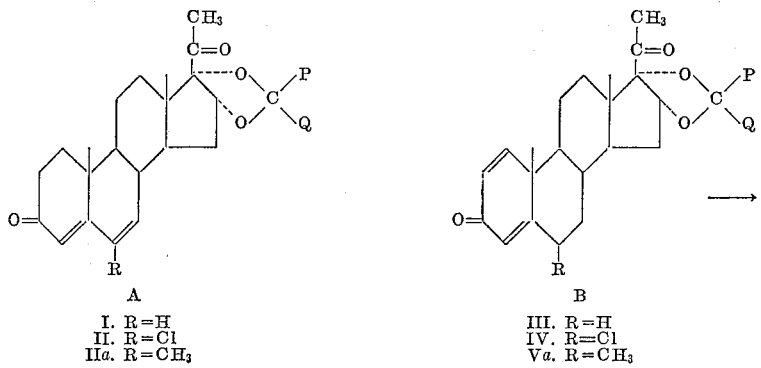

A
I. R=H
II. R=Cl
IIa. R=CH₃

B
III. R=H
IV. R=Cl
Va. R=CH₃

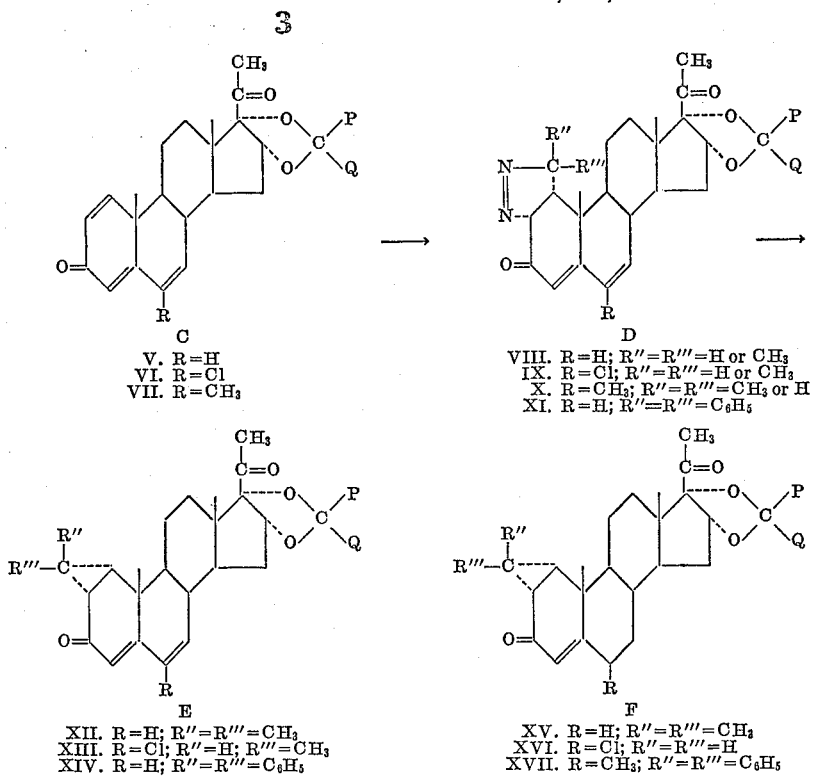

V. R=H
VI. R=Cl
VII. R=CH₃

VIII. R=H; R″=R‴=H or CH₃
IX. R=Cl; R″=R‴=H or CH₃
X. R=CH₃; R″=R‴=CH₃ or H
XI. R=H; R″=R‴=C₆H₅

XII. R=H; R″=R‴=CH₃
XIII. R=Cl; R″=H; R‴=CH₃
XIV. R=H; R″=R‴=C₆H₅

XV. R=H; R″=R‴=CH₃
XVI. R=Cl; R″=R‴=H
XVII. R=CH₃; R″=R‴=C₆H₅

In the first step of the process of this invention, the starting materials, Compounds A and B are treated with 2,3-dichloro-5,6-dicyanobenzoquinone to yield the Δ¹,⁴,⁶-pregnatriene derivatives (Compounds C). In the case of Compounds B, the reaction must be carried out in the presence of a mineral acid, for example, HCl.

Alternatively, Compounds A may be dehydrogenated as by treatment with selenium dioxide, to yield the Δ¹,⁴,⁶-pregnatriene derivatives (Compounds C).

Compounds C may then be treated with a diazoalkane, for example, diazomethane or diazoethane or aryl substituted diazoalkane, for example, diazo-diphenylmethane in a suitable organic solvent, for example, ether, to yield the 1α,2α-pyrazolino derivatives (Compounds D), which are new compounds of this invention.

Compounds D may then be treated with an acidic reagent, e.g., perchloric acid, boron trifluoride etherate, to yield the 1α,2α-methylene or substituted methylene derivatives (Compounds E) which are also new compounds of this invention. Alternatively, Compounds D may be pyrolyzed in vacuum to yield Compounds E.

Compounds E may then be treated with a reducing agent, for example, palladium on charcoal to yield the 1α,2α-methylene or substituted methylene derivatives (Compounds F) which are also new compounds of this invention.

If a ketal or acetal grouping other than that present in the starting steroid reactant is desired, Compounds C may be cleaved by treatment with aqueous formic acid, as described in the application of Fried, Serial No. 84,989, filed January 26, 1961, now abandoned, followed by hydrolysis of the intermediate formic acid ester to yield new intermediates of this invention of the formula:

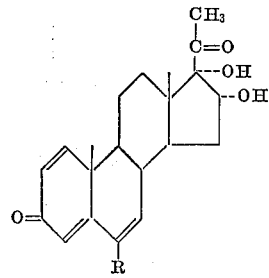

wherein R is as hereinbefore defined.

These new intermediates are then reacted with an aldehyde or ketone of the formula:

wherein P and Q are as hereinbefore defined. The reaction is preferably carried out by treating a suspension or solution of the dihydroxy steriod in the aldehyde or ketone (or an organic solvent and the aldehyde or ketone, if the aldehyde or ketone is a solid) with an acid catalyst (e.g., perchloric acid, p-toulenesulfonic acid, hydrochloric acid, and so forth), neutralizing the acid and recovering the acetal or ketal derivative formed.

Suitable aldehyde and ketone reactants include lower alkanals of at least two carbon atoms, such as paraldehyde, propanal and hexanal; di(lower alkyl)ketones, such as acetone, diethylketone, dibutylketone, methylethylketone, and methylisobutylketone; cycloalkanones, such as cyclobutanone, cyclopentanone, cyclohexanone, suberone, and cyclodexanone; cycloalkyl (lower alkanals), such as cyclopropylcarboxaldehyde, cyclobutylcarboxaldehyde, cyclopentylcarboxaldehyde,
cyclohexylcarboxaldehyde,
cycloheptylcarboxaldehyde,
cyclooctylcarboxaldehyde,
cyclopropylacetaldehyde,
cyclobutylacetaldehyde,
cyclopentylacetaldehyde,
cyclohexylacetaldehyde,
β-cyclopentylpropionaldehyde,
γ-cyclohexylbutyraldehyde, and
3-cyclopropylcarproaldehyde;

cycloalkyl(lower alkanones), such as cyclopropyl methyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-pentyl ketone, cyclohexyl methyl ketone, and cyclooctyl methyl ketone; dicycloalkyl ketones, such as dicyclopropyl ketone, dicyclobutyl ketone, dicyclopentyl ketone, dicyclohexyl ketone, cyclopentyl cyclohexyl ketone, cyclopropylmethyl cyclopropyl ketone, 2-cyclobutylethyl cyclopropyl ketone, 3- cyclopentylmethyl cyclopentyl ketone, 5-cyclohexylhexyl cyclohexyl ketone, di(cyclopentylmethyl) ketone, cyclohexylmethyl cyclopentyl ketone, and di(4-cyclohexylpentyl) ketone; cycloalkyl monocyclic aromatic ketones, such as cyclopropyl phenyl ketone, cyclohexyl p-chlorophenyl ketone, cyclopentyl o-methoxyphenyl ketone, cyclopentyl o,p-dihydroxyphenyl ketone, cyclohexyl m-tolyl ketone, cyclopropyl p-ethyl-phenyl ketone, cyclopropyl p-nitrophenyl ketone, and cyclohexyl p-acetamidophenyl ketone; cycloalkyl(lower alkyl) monocyclic aromatic ketones, such as cyclopentylmethyl phenyl ketone; cycloalkyl monocyclic aromatic (lower alkyl) ketones, such as cyclopentyl benzyl ketone, cyclohexyl phenethyl ketone, and cyclobutyl benzyl ketone; cycloalkyl (lower alkyl) monocyclic aromatic (lower alkyl) ketones, such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone; cycloalkyl (lower alkyl)monocyclic heterocyclic ketones, such as cyclopentylmethyl 2-piperidinyl ketone, cyclohexylethyl 2-morpholinyl ketone and cyclopropyl 2-thienyl ketone; cycloalkyl monocyclic heterocyclic (lower alkyl) ketones, such as cyclopentyl thenyl ketone, cyclohexyl furfuryl ketone and cyclopropyl 2-piperidinylmethyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g., p-chlorobenzaldehyde and p-fluorobenzaldehyde), lower alkoxybenzaldehydes (e.g., o-anisaldehyde), di(lower alkoxy)-benzaldehydes (e.g., veratraldehyde), hydroxybenzaldehydes (e.g. salicycladehyde), dihydroxybenzaldehydes (e.g., resorcyaldehyde), lower alkyl benzaldehydes (e.g., m-tolualdehyde and p-ethylbenzaldehyde), di(lower alkyl) benzaldehydes (e.g., o,p-dimethylbenzaldehyde), nitrobenzaldehydes, acylamidobenzaldehydes (e.g. N-acetylanthraniladehyde), and cyanobenzaldehydes; monocyclic carboxylic aromatic lower alkanals, such as phenylacetaldehyde, α-phenylpropionaldehyde, β-phenylpropionaldehyde, γ-phenylbutyraldehyde, and aromatically-substituted halo lower alkoxy, hydroxy, lower alkyl, nitro, acylamido and cyano derivatives thereof; monocyclic heterocyclic aldehydes, such as picolinaldehydes, furfural, thiophen carbonals, and halo, lower alkoxy, hydroxy, lower alkyl, nitro, and cyano derivatives thereof; monocyclic heterocyclic lower alkanals; monocyclic carbocyclic aromatic ketones, such as acetophenone, α,α,α-trifluoroacetophenone, propiophenone, butyrophenone, valerophenone, isocaprophenone, halophenyl lower alkyl ketones (e.g., p-chloroacetophenone and p-chloropropiophenone), (lower alkoxy) phenyl lower alkyl ketones (e.g., p-anisyl methyl ketone), di(lower alkoxy) phenyl lower alkyl ketones, hydroxy-phenyl lower alkyl ketones, dihydroxyphenyl lower alkyl ketones (e.g., resacetophenone), (lower alkyl)phenyl lower alkyl ketones (e.g., methyl p-tolyl ketone), di(lower alkyl) phenyl lower alkyl ketones (o,p-xylyl methyl ketone), nitrophenyl lower alkyl ketones (e.g., p-nitroacetophenone), acylamidophenyl lower alkyl ketones (e.g., acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetyl-thiophene and alloxan; and monocyclic heterocyclic lower alkanones.

To prepare the free 16α,17α-dihydroxy steroids from Compounds C, the acetal or ketal group is cleaved by treatment with aqueous formic acid. If concentrated aqueous formic acid is used (e.g., 90% formic acid), a 16-formic acid ester is formed which is then hydrolyzed by treatment with 10% aqueous potassium carbonate to yield the free 16,17-dihydroxy steroid derivative. These intermediates can then be converted to one of the 16,17-acetals or ketals of this invention by treatment with one of the aldehydes or ketones mentioned hereinbefore in the presence of an acid catalyst (e.g., perchloric acid).

The following examples illustrate the invention (all temperatures being in centigrade):

EXAMPLE 1

*16α,17α-(dimethylmethylenedioxy)-$\Delta^{1,4,6}$-pregnatriene-3,20-dione*

A solution of 10 ml. of dioxane containing 768 mg. of 16α,17α - (dimethylmethylenedioxy) - $\Delta^{4,6}$ - pregnadiene-3,20-dione and 500 mg. of 2,3-dichloro-5,6-dicyanobenzoquinone is refluxed for 17 hours. The reaction mixture is cooled and the insoluble, reduced benzoquinone is removed by filtration. After evaporation of the solvent, the residue is dissolved in chloroform and passed through a column of 25 g. of neutral activity I alumina. Elution with chloroform gives 710 mg. of material, which on recrystallization from hexane gives 460 mg. of 16α,17α-(dimethylmethylenedioxy)-$\Delta^{1,4,6}$ - pregnatriene - 3,20 - dione, M.P. 188–190° C., $[\alpha]_D^{25}+42.5°$, $\lambda_{max}^{EtOH}$ 222 m$\mu$ ($\epsilon$=12,300), 258 ($\epsilon$=10,200), 298 m$\mu$ ($\epsilon$=13,700)

*Analysis.*—Calc'd for $C_{24}H_{30}O_4$: C, 75.36; H, 7.91. Found: C, 75.32; H, 7.91.

EXAMPLE 2

*16α,17α-(dimethylmethylenedioxy)-$\Delta^{1,4,6}$-pregnatriene-3,20-dione*

A solution of 100 mg. of 16α,17α-(dimethylmethylenedioxy)-$\Delta^{4,6}$-pregnadiene-3,20-dione and 60 mg. of selenium dioxide in 10 ml. of tert. butanol containing 0.02 ml. of pyridine is refluxed for twenty-four hours under nitrogen. After cooling, the reaction mixture is filtered and the solvent evaporated. The residue is taken up in acetone and refluxed with acetone-deactivated sponge nickel catalyst for one hour. After removal of the catalyst by filtration and evaporation of the acetone, the residue is recrystallized from methanol to give 45 mg. of 16α,17α-(dimethylmethylenedioxy)-$\Delta^{1,4,6}$ - pregnatriene - 3,20 - trione, M.P. 185–188° C.

EXAMPLE 3

*16α,17α-(dimethylmethylenedioxy)-$\Delta^{1,4,6}$ - pregnatriene-3,20-dione*

Hydrogen chloride is bubbled through a solution of 96 mg. of 16α,17α-(dimethylmethylenedioxy)-$\Delta^{1,4}$-pregnadiene-3,20-dione in 2.2 ml. of dioxane containing 61.3 mg. of 2,3-dichloro-5,6-dicyanobenzoquinone for ten seconds. After two hours at room temperature, the solution is filtered; and the filtrate is evaporated. The resulting residue is dissolved in chloroform and passed through a column of 2 g. of neutral alumina. After evaporation of the chloroform, the resulting residue of 77 mg. is purified by thin layer chromatography on activity V alumina in a solvent system of hexane-chloroform 1:1 with ethyl acetate; 42 mg. of 16α,17α-(dimethylmethylenedioxy)-$\Delta^{1,4,6}$-pregnatriene-3,20-dione are obtained which have the typical UV absorption of a $\Delta^{1,4,6}$-3-one.

EXAMPLE 4

Following procedures set forth in Example 1, 2 or 3 but substituting the 6-methyl or 6-halo derivatives of 16α,17α-(dimethylmethylenedioxy) - $\Delta^{4,6}$ - pregnadiene-3,20-dione for 16α,17α-(dimethylmethylenedioxy)-$\Delta^{4,6}$-pregnadiene-3,20-dione, there is obtained the 6-methyl or 6-halo derivatives of 16α,17α-(dimethylmethylenedioxy)-$\Delta^{1,4,6}$-pregnatriene-3,20-dione, respectively.

EXAMPLE 5

16α,17α-(dimethylmethylenedioxy)-1α,2α-(4',3'-Δ¹-pyrazolino)-Δ⁴,⁶-pregnadiene-3,20-dione A solution of 120 ml. of ether containing 13 mmole of diazomethane is added to 450 mg. of 16α,17α-(dimethylmethylenedioxy) - Δ¹,⁴,⁶ - pregnatriene-3,20-dione (1.2 mmole). After two days at room temperature, yellow crystalline material settles out and is collected by centrifugation. After washing with ether and drying, this material weighs 206 mg. and has M.P. 259–260° C. (dec.), $\lambda_{max.}^{EtOH}$ 230 m$\mu$ (flat) ($\epsilon$ =5,800), 293 m$\mu$ ($\epsilon$ =20,400)

The centrifugate is left at room temperature for an additional three days. The resulting precipitate is collected and weighs 194 mg., M.P. 240–243° C. (dec.). Recrystallization from methanol gives 94 mg. of 16α,17α-(dimethylmethylenedioxy)-1α,2α-(4',3' - Δ¹ - pyrazolino)-Δ⁴,⁶-pregnadiene-3,20-dione, M.P. 261–262° C. The analytical sample has M.P. 262–263° C. (dec.), $[\alpha]_D^{25}$ −21.6°, $\lambda_{max.}^{EtOH}$ 235 mm. ($\epsilon$ =4,000), 293 mm. ($\epsilon$ =21,800)

*Analysis.*—Calc'd for $C_{25}H_{32}O_4N_2$: C, 70.72; H, 7.60; N, 6.60. Found: C, 70.56; H, 7.66; N, 6.87.

Similarly, if the 6-halo or 6-alkyl derivatives obtained in Example 4 are processed in accordance with the procedure of Example 5, the 6-halo or 6-alkyl-1α,2α-(4',3'-Δ'-pyrazolino)-Δ⁴,⁶-pregnadiene derivatives are produced, respectively.

EXAMPLE 6

1α,2α-methylene-16α,17α-(dimethylmethylenedioxy)-Δ⁴,⁶-pregnadiene-3,20-dione A solution of 0.25 ml. of 70% perchloric acid in 25 ml. of acetone is added to 109 mg. of 16α,17α-(dimethylmethylenedioxy)-1α,2α-(4',3'-Δ¹-pyrazolino) - Δ⁴,⁶ - pregnadiene-3,20-dione. The pyrazoline dissolves with evolution of nitrogen. When the evolution of gas ceases the action mixture is diluted with water and neutralized by the addition of 10% potassium carbonate solution. The actone is evaporated and the aqueous suspension is extracted with chloroform. After washing the chloroform solution with water and drying over magnesium sulfate, the chloroform is evaporated leaving a residue of 76 mg. Recrystallization from methanol gives 30 mg. of 1α,2α-methylene - 16α,17α - (dimethylmethylenedioxy) - Δ⁴,⁶-pregnadiene-3,20-dione, M.P. 254–255° C., $[\alpha]_D^{21}$ +191°, $\lambda_{max.}^{EtOH}$ 282 m$\mu$ ($\epsilon$ =20,800)

*Analysis.*—Calc'd for $C_{25}H_{32}O_4$: C, 75.72; H, 8.13. Found: C, 75.76; H, 8.17.

Similarly, if the 6-halo or 6-alkyl derivatives of Example 5 are treated in accordance with the procedures of Example 6, the 1α,2α-methylene-6-halo or 6-alkyl-Δ⁴,⁶-pregnadiene derivatives are produced, respectively.

EXAMPLE 7

1α,2α-methylene-16α,17α-(dimethylmethylenedioxy)-Δ⁴,⁶-pregnadiene-3,20-dione Pyrazoline (29 mg.) is heated under vacuum in a sublimation tube at 235 to 245° C. and 0.001 mm. Hg pressure. The sample decomposes with the evolution of gas and sublimes. The sublimate is recrystallized from methanol to give a first crop of 7 mg. of starting material and a second crop of 9 mg. of 1α,2α-methylene-16α,17α-(dimethylmethylenedioxy) - Δ⁴,⁶-pregnadiene-3,20-dione, M.P. 253–254° C., $\lambda_{max.}^{EtOH}$ 284 m$\mu$ ($\epsilon$ =19,600)

EXAMPLE 8

1α,2α-methylene-16α,17α-(dimethylmethylenedioxy)-Δ⁴,⁶-pregnadiene-3,20-dione Similarly, following the procedure of Example 6 but substituting an equivalent amount of boron trifluoride etherate for perchloric acid there is obtained 1α,2α-methylene - 16α,17α - (dimethylmethylenedioxy) - Δ⁴,⁶-pregnadiene-3,20-dione.

EXAMPLE 9

1α,2α-methylene-16α,17α-(dimethylmethylenedioxy)-Δ⁴-pregnene-3,20-dione

A solution of 1α,2α-methylene-16α,17α-(dimethylmethylenedioxy)-Δ⁴,⁶-pregnadiene-3,20-dione in 5 ml. of methanol is added to a hydrogen saturated suspension of 10 mg. of 5% palladium on charcoal in 5 ml. of methanol containing 4 mg. of potassium hydroxide. The mixture is stirred at room temperature in an atmosphere of hydrogen, and after one equivalent of hydrogen is absorbed, the catalyst is filtered, and the solution neutralized with glacial acetic acid and the solvent is then evaporated. The residue is dissolved in chloroform, and the chloroform solution is washed with water, dried over magnesium sulfate and evaporated. Recrystallization of the resulting material from methanol gives 11 mg. of 1α,2α-methylene - 16α,17α - (dimethylmethylenedioxy) - Δ⁴-pregnene-3,20-dione, M.P. 252–253° C., $[\alpha]_D^{18}$ +266°, $\lambda_{max.}^{EtOH}$ 240 m$\mu$ ($\epsilon$ =12,500)

*Analysis.*—Calc'd for $C_{25}H_{34}O_4$: C, 75.34; H, 8.60. Found: C, 76.37; H, 8.49.

Similarly, following the procedure of Example 9 but substituting equivalent amounts of the 6-halo and 6-methyl derivatives of 1α,2α-(dimethylmethylenedioxy)-Δ⁴,⁶-pregnadiene-3,20-dione for 1α,2α-methylene-16α,17α-(dimethylmethylenedioxy) - Δ⁴,⁶ - pregnadiene-3,20-dione there is obtained the 6-halo or 6-methyl derivatives of the 1α,2α-methylene-16α,17α-(dimethylmethylenedioxy) - Δ⁴-pregnene-3,20-dione, respectively.

EXAMPLE 10

16α,17α-(β-methyl-α-phenyl-methylenedioxy)-Δ¹,⁴,⁶-pregnatriene-3,20-dione

A solution of 1.17 g. of 16α,17α-(β-methyl-α-phenyl-methylenedioxy)-Δ⁴,⁶-pregnadiene-3,20-dione (Ib) and 700 mg. of 2,3-dichloro-5,6 dicyanobenzoquinone in 50 ml. of dioxane is refluxed for 17 hours. The reaction mixture is cooled, diluted with 55 ml. of carbon tetrachloride and filtered. The filtrate is evaporated, dissolved in chloroform and passed through 50 g. of neutral alumina. Elution of the alumina with 500 ml. of chloroform and evaporation of the solvent gives 1.14 g. of crude product. This material is purified by thin layer chromatography on activity V alumina in a hexane-chloroform 1:4 system. Elution with ethyl acetate gives 813 mg. of material which on recrystallization from ether-hexane gives 582 mg. of 16α,17α-(β-methyl-α-phenyl-methylenedioxy)-Δ¹,⁴,⁶-pregnatriene-3,20-dione, M.P. 81–83° C., (bubbling). After drying the analytical sample at 50° C. and high vacuum for twenty-four hours, the M.P. is raised to 93–95° C. (bubbling), $[\alpha]_D^{23}$ −70.4°, $\lambda_{max.}^{EtOH}$, 220 m$\mu$ ($\epsilon$ =12,200), 260 m$\mu$ ($\epsilon$ =11,800), 299 m$\mu$ ($\epsilon$ =14,000)

*Analysis.*—Calc'd for $C_{29}H_{32}O_4$: C, 78.35; H, 7.26. Found: C, 78.83; H, 7.45.

EXAMPLE 11

16α,17α-(β-methyl-α-phenyl-methylenedioxy)-Δ¹,⁴,⁶-pregnatriene-3,20-dione

A solution of 100 mg. of 16α,17α-(β-methyl-α-phenyl-methylenedioxy)-Δ⁴,⁶-pregnadiene-3,20-dione (Ib) in 10 ml. of tert. butanol containing 60 mg. of selenium dioxide and 0.02 ml. of pyridine is refluxed for seventeen hours under nitrogen. After cooling the mixture is filtered and evaporated. The residue is taken up in acetone and refluxed with acetone-deactivated sponge nickel catalyst for one hour. The catalyst is filtered and the solvent evaporated to give 16α,17α-(β-methyl-α-phenyl-methylenedioxy)-Δ¹,⁴,⁶-pregnatriene-3,20-dione.

EXAMPLE 12

*16α,17α-(β-methyl-α-phenyl-methylenedioxy)-Δ$^{1,4,6}$-pregnatriene-3,20-dione*

Hydrogen chloride is bubbled through a solution of 108 mg. of 16α,17α-(β-methyl-α-phenyl-methylenedioxy)-Δ$^{1,4}$-pregnadiene-3,20-dione and 61 mg. of 2,3-dichloro-5,6-dicyanobenzoquinone in 2.2 ml. of dioxane for ten seconds. After two hours at room temperature, the solution is filtered and the solvent evaporated. The residue is dissolved in chloroform and passed through a column of neutral alumina and eluted with chloroform. After evaporation of the chloroform, the crude material is purified by thin layer chromatography on activity V alumina and eluted with ethyl acetate to give 43 mg. of 16α,17α-(β-methyl-α-phenyl-methylenedioxy) - Δ$^{1,4,6}$-pregnatriene-3,20-dione.

EXAMPLE 13

*16α,17α - (β - methyl - α-phenyl-methylenedioxy)-1α,2α-(4′,3′-Δ$^1$-pyrazolino)-Δ$^{4,6}$-pregnadiene-3,20-dione*

A solution of 315 mg. of 16α,17α-(β-methyl-α-phenyl-methylenedioxy) - Δ$^{1,4,6}$ - pregnatriene - 3,20-dione (0.7 mmole) in 5 ml. of methylene chloride is treated with 130 ml. of ether containing 7.0 mmole of diazomethane and left at room temperature for four days. The solvent and excess diazomethane are removed by entrainment with helium, and the residue is chromatographed on 12 g. of activity V alumina. Elution with hexane-benzene 1:1 and benzene gives 210 mg. of material which after two recrystallizations from methanol gives 45 mg. of 16α,17α - (β - methyl - α-phenyl-methylenedioxy)-1α,2α-(4′-3′-Δ$^1$-pyrazolino)-Δ$^{4,6}$-pregnadiene-3,20-dione, M.P. 209–210° C. The analytical sample has M.P. 214–215° C., $[α]_D^{21}$ −130°, $λ_{max.}^{EtOH}$ 234 mμ (ε=4,200), 292 mμ (ε−25,600)

*Analysis.*—Calc'd for $C_{30}H_{34}O_4N_2$: C, 74.05; H, 7.04. Found: C, 74.11; H, 7.02.

EXAMPLE 14

*1α,2α-methylene-16α,17α-(β-methyl-α-phenyl-methylenedioxy)-Δ$^{4,6}$-pregnadiene-3,20-dione*

A solution of 0.1 ml. of 70% perchloric acid in 10 ml. of acetone is added to 33 mg. of 16α,17α-(β-methyl-α-phenyl-methylenedioxy) - 1α,2α - (4′,3′-Δ$^1$-pyrazolino)-Δ$^{4,6}$-pregnadiene-3,20-dione. After five minutes at room temperature, the reaction mixture is diluted with water and neutralized with 10% potassium carbonate. The solvent is evaporated and the product extracted with chloroform. The chloroform solution is washed with water, dried over magnesium sulfate and evaporated to give 31 mg. of crude material. Purification by thin layer chromatography on activity V alumina and elution with ethyl acetate gives 25 mg. of 1α,2α-methylene-16α,17α-(β-methyl - α - phenylmethylenedioxy)-Δ$^{4,6}$-pregnadiene-3,20-dione.

EXAMPLE 15

*16α,17α-(dimethylmethylenedioxy)-1α,2α-(4′,3′-5′-methyl-Δ$^1$-pyrazolino)-Δ$^{4,6}$-pregnadiene-3,20-dione*

A solution of 165 ml. of ether containing 23 mmole of diazoethane is added to 852 mg. of 16α,17α-(dimethylmethylenedioxy)-Δ$^{1,4,6}$-pregnatriene - 3,20 - dione. After four days at room temperature, the excess diazoethane is removed by entrainment with helium and the ether is evaporated. The resulting residue is recrystallized from methanol, 159 mg. of 16α,17α-(dimethylmethylenedioxy)-1α,2α-(4′,3′-5′-methyl-Δ$^1$-pyrazolino) - Δ$^{4,6}$ - pregnadiene-3,20-dione, M.P. 220–221° C. (dec.). The analytical sample has M.P. 221–221.5° C. (dec.), $[α]_D^{21}$ +152.6°, $λ_{max.}^{EtOH}$ 289 mμ (ε=21,000)

*Analysis.*—Calc'd for $C_{26}H_{34}O_4N_2$: C, 71.20; H, 7.81. Found: C, 71.34; H, 8.03.

EXAMPLE 16

*1α,2α-methylene-16α,17α-(dimethylmethylenedioxy)-Δ$^{4,6}$-pregnadiene-3,20-dione*

Following the procedure set forth in Examples 6, 7 or 8 but substituting an equivalent amount of the 16α,17α-(dimethylmethylenedioxy)-1α,2α-(4′,3′-5′ - methyl - Δ$^1$-pyrazolino)-Δ$^{4,6}$-pregnadiene-3,20-dione for 16α,17α-(dimethylmethylenedioxy) - 1α,2α - (4′,3′-Δ$^1$-pyrazolino)-Δ$^{4,6}$-pregnadiene-3,20-dione there is obtained 1α,2α-methylene-16α,17α-(dimethylmethylenedioxy) - Δ$^{4,6}$-pregnadiene-3,20-dione.

EXAMPLE 17

*16α,17α-(dimethylmethylenedioxy)-1α,2α-(4′,3′,5′,5′-diphenyl-Δ$^1$-pyrazolino)-Δ$^{4,6}$-pregnadiene-3,20-dione*

Following the procedure set forth in Example 5 but substituting diazophenylmethane for diazomethane there is obtained 16α,17α-(dimethylmethylenedioxy)-1α,2α-(4′,3′,5′,5′-diphenyl - Δ$^1$ - pyrazolino)-Δ$^{4,6}$-pregnadiene-3,20-dione.

EXAMPLE 18

*1α,2α-diphenylmethylene-16α,17α-(dimethylmethylenedioxy)-Δ$^{4,6}$-pregnadiene-3,20-dione*

Following the procedure set forth in Examples 6, 7 or 8 but substituting an equivalent amount of 16α,17α-(dimethylmethylenedioxy) - 1α,2α - (4′,3′,5′,5′-diphenyl-Δ$^1$-pyrazolino)-Δ$^{4,6}$-pregnadiene-3,20-dione for 16α,17α-(dimethylmethylenedioxy) - 1α,2α - (4′,3′,Δ$^1$ - pyrazolino)-Δ$^{4,6}$-pregnadiene-3,20-dione there is obtained 1α,2α-diphenylmethylene - 16α,17α - (dimethylmethylenedioxy)-Δ$^{4,6}$-pregnadiene-3,20-dione.

The invention may be variously otherwise embodied within the scope of the appended claims.

What is claimed is:

1. A compound selected from the group consisting of steroids of the formulae:

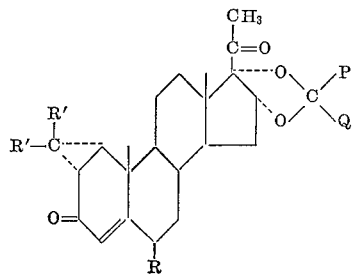

and

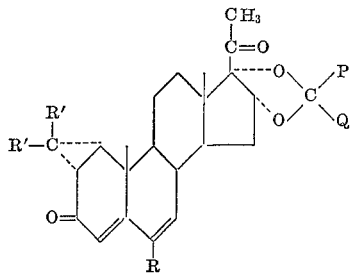

wherein R is selected from the group consisting of hydrogen, lower alkyl and halogen; each R′ is selected from the group consisting of hydrogen, lower alkyl and phenyl; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monoyclic heterocyclic lower alkyl; and together with the carbon to which they are joined P and Q is selected from the group consisting of monocyclic cycloalkyl and monocyclic heterocyclic.

2. A compound of the formula:

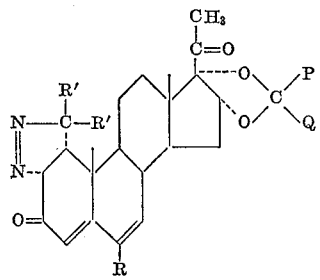

wherein R, R', P and Q are as defined in claim 1.

3. 16α,17α-(dimethylmethylenedioxy) - 1α,2α - (4',3'-Δ¹-pyrazolino)-Δ⁴,⁶-pregnadiene-3,20-dione.

4. 1α,2α-methylene - 16α,17α - (dimethylmethylenedioxy)-Δ⁴,⁶-pregnadiene-3,20-dione.

5. 1α,2α-methylene - 16α,17α - (dimethylmethylenedioxy)-Δ⁴-pregnene-3,20-dione.

6. 16α,17α-(β-methyl - α - phenyl-methylenedioxy)-1α,2α-(4',3'-Δ¹-pyrazolino)-Δ⁴,⁶-pregnadiene-3,20-dione.

7. 1α,2α-methylene - 16α,17α - (β-methyl - α - phenyl-methylenedioxy)-Δ⁴,⁶-pregnadiene-3,20-dione.

8. 16α,17α-(dimethylmethylenedioxy) - 1α,2α - (4',3',5'-methyl-Δ¹-pyrazolino)-Δ⁴,⁶-pregnadiene-3,20-dione.

9. 1α,2α-diphenylmethylene - 16α,17α - (dimethylmethylenedioxy)-Δ⁴,⁶-pregnadiene-3,20-dione.

10. 16α,17α-(dimethylmethylenedioxy) - 1α,2α - (4',3',5',5'-diphenyl-Δ¹-pyrazolino)-Δ⁴,⁶-pregnadiene-3,20-dione.

References Cited by the Examiner
UNITED STATES PATENTS

| | | | |
|---|---|---|---|
| 3,073,850 | 1/63 | Wiechert | 260—397.4 |
| 3,127,396 | 3/64 | Wiechert et al. | 260—239.5 |

LEWIS GOTTS, *Primary Examiner.*